United States Patent [19]

Schommler

[11] Patent Number: 4,556,444

[45] Date of Patent: Dec. 3, 1985

[54] HEATING DEVICE FOR CORRUGATED CARDBOARD IN A CORRUGATED CARDBOARD PASTING MACHINE

[75] Inventor: Manfred Schommler, Quickborn-Heide, Fed. Rep. of Germany

[73] Assignee: Werner H.K. Peters Maschinenfabrik GmbH, Fed. Rep. of Germany

[21] Appl. No.: 639,683

[22] Filed: Aug. 9, 1984

[30] Foreign Application Priority Data

Aug. 19, 1983 [DE] Fed. Rep. of Germany ....... 3329928
Jan. 7, 1984 [DE] Fed. Rep. of Germany ....... 3400333

[51] Int. Cl.[4] ............................................. B32B 31/12

[52] U.S. Cl. ........................................ 156/359; 34/48; 34/162; 34/236; 156/470; 156/499

[58] Field of Search .......................... 34/162, 236, 48; 156/471, 499, 555, 583.5, 359, 470

[56] References Cited

U.S. PATENT DOCUMENTS

| | | | |
|---|---|---|---|
| 3,149,013 | 9/1964 | Browning et al. | 156/583.5 X |
| 3,175,300 | 3/1965 | Nitchie . | |
| 3,226,840 | 1/1966 | Moser et al. | 34/41 |
| 3,340,125 | 9/1967 | Drenning et al. | 156/285 X |
| 3,358,378 | 12/1967 | Downs . | |
| 3,434,901 | 3/1969 | Griffiths et al. | 156/470 X |
| 3,829,338 | 8/1974 | Hayasi et al. | 156/470 X |
| 3,861,057 | 1/1975 | Wittstock et al. | 34/162 X |
| 3,981,758 | 9/1976 | Thayer et al. | 156/64 |
| 4,042,446 | 8/1977 | Lawton | 156/359 |
| 4,169,007 | 9/1979 | Pray | 156/359 |

*Primary Examiner*—Robert A. Dawson
*Attorney, Agent, or Firm*—Harness, Dickey & Pierce

[57] ABSTRACT

A heating device for corrugated cardboard in a corrugated cardboard pasting machine, comprising several heating plates spaced in feeding direction and covering the maximum width of the corrugated cardboard strip while being adapted to be connected to a source of heat via a control device and against the upward facing heating surface of which the cardboard is guided under load by a weighting belt and/or compressed air, with two or more separate heating plates arranged side by side transversely of the direction of movement of the corrugated cardboard in at least one section and adapted to be separately heated by means of the control device.

17 Claims, 3 Drawing Figures

HEATING DEVICE FOR CORRUGATED CARDBOARD IN A CORRUGATED CARDBOARD PASTING MACHINE

The invention relates to a heating device for corrugated cardboard in a corrugated cardboard pasting machine, comprising several heating plates spaced in feeding direction and covering the maximum width of the corrugated cardboard strip while being adapted to be connected via a control means to a source of heat, with the corrugated cardboard being guided against the upward facing heating surface of said heating plates under load by a weighting belt and/or compressed air.

In conventional cardboard pasting machines the heating plates extend over at least the maximum width of a corrugated cardboard strip. Heating is effected in most cases with the aid of vapour. The supply of the vapour may be adjusted with the aid of suitable armatures, in order to obtain certain temperatures at the heating surface. The supply of energy is made dependent inter alia on the velocity of the strip. Of course, in case of an increase of the velocity of the strip, the supply of heat must be increased. With the velocity reduced, vice versa, the supply of heat must be reduced and, if possible, interrupted immediately when a standstill occurs. Otherwise the danger exists of the cardboard being damaged by too high temperatures.

It happens relatively often that the moisture of the individual layers of the corrugated cardboard is not uniform over the width thereof. A reason for this lies in that during the storage of the rolls of paper moisture penetrates from outside, but only to a certain depth, which in turn is dependent on the storage time. In the corrugated cardboard pasting machine the moisture differing over the width of the strip is effective to cause a differing dehumidification. Upon further processing, therefore, the danger exists that the cardboard wil become curved and be subjected to a stress which is disadvantageous for the construction of articles made of cardboard blanks.

It is therefore the object of the invention to provide a heating device for corrugated cardboard in a corrugated cardboard pasting machine enabling a uniform drying also over the width of the cardboard strip.

This object is attained in accordance with the invention in that in at least one section two or more separate heating plates are arranged side by side transversely of the direction of movement of the corrugated cardboard strip and are adapted to be separately heated by means of the control device.

Conventional corrugated cardboard pasting machines as a rule comprise several heating sections each of which comprising several elongated heating plates disposed transversely of the feeding direction. In the device according to the invention the same or similar heating plates may be employed but with an orientation rotated through 90°. Dependant on the width requiring four or five such plates may be arranged, for example to extend longitudinally in parallel with each other. By controlling the energy supply to the individual plates they may be provided with differing temperatures at the heating surface. Since as a rule the corrugated cardboard layers have a higher degree of moisture outside than within, the outer plates, for example, may have a higher temperature than the central ones. With the aid of the invention one succeeds in a simple manner in maintaining the dehumidification uniform as it takes place during heating and thus avoiding later curvatures of the corrugated cardboard.

It goes without saying that all the sections may be provided with heating plates arranged side by side adapted to be separately heated.

Another embodiment of the invention consists in that each heating plate has a moisture sensor respectively associated therewith in front of the heating device in the direction of movement. The moisture sensors measure the moisture content of the strip sections respectively supplied to the associated heating plates, so that the supply of heat to the respective heating plates may be correspondingly adjusted. Such moisture sensors are known per se and operate contactless, for example, of an infrared or microwave basis. With the aid of such moisture sensors it is possible in accordance with another embodiment of the invention to couple them with the control device for the purpose of obtaining an automatic control of the temperature of the individual heating plates.

If, in accordance with another embodiment of the invention, additional moisture sensors associated with the heating plates are arranged at the rear of the heating device in the direction of movement which are connected to a regulator in which the measured values of moisture are compared with a preset value for the purpose of adjusting the supply of heat to the heating plates by means of the control device, the degree of dehumidification may in addition be regulated automatically. It is possible thereby not only to obtain a uniform drying but the degree of drying may also be determined.

In another embodiment of the invention provision is made for a velocity sensor to measure the velocity of the strip of corrugated cardboard and provide a signal for the control device for the purpose of controlling the heat supply to the heating plates in dependence upon the speed of the strip. As already mentioned above, it is to the purpose to adjust the supply of heat to the heating plates in dependence upon the speed of the corrugated cardboard.

It goes without saying that a control of the supply of heat to the individual heating plates may be effected in the individual series-arranged sections. This, however, is known per se. Usually, the front heating plates are heated in a stronger degree than the rear ones, in order to avoid impairment of already largely dried material by too great a supply of heat.

If in the foregoing the talk is of heating plates arranged according to the invention side by side, it goes without saying that the invention also includes such constructions as provide for a subdivision of the heating surface transversely of the feeding direction. A continuous heating plate in a transverse direction could also be imagined said heating plate being subdivided into individual chambers largely thermally insulated from each other.

It is known to bias the heating and cooling portion of a corrugated cardboard pasting machine with compressed air over the broadside of the strip of corrugated cardboard either directly or via a weighting belt. In this manner, a particularly favourable distribution of the pressure is obtained which has an advantageous effect on the operational step of pasting and drying the strip of corrugated cardboard. Besides, height and depth phenomena which are caused by failure of one or several waves may be balanced by the compressed air bias and will no longer have any disadvantageous influence on the quality of the corrugated cardboard. Finally, the heat transfer from the heating plates to the strip of corrugated cardboard is also improved by the uniform pressure per unit area, thereby enabling the processing of heavy types of paper at a high passage speed. It is also known to arrange several hood-like compressed air devices in series one after the other in the direction of feeding. Such an embodiment of the invention provides in this connection for the arrangement of two or more separate compressed air hoods in at least one section transversely of the direction of feed, which are adapted to be separately controlled.

In the known device a ventilator is disposed in the pressure device or the pressure device is connected to a source of compressed air via one or several hoses. With the device according to the invention, now, the air pressure may be adjusted separately in ech sub-hood, so that a different load on the corrugated cardboard strip may be adjusted over the width of the heating device. Since, as already mentioned, the load also influences the heat transfer, it is possible with the aid of the measure according to the invention to control the dehumidification over the width of the corrugated cardboard strip in addition to the subdivided heating plates.

Usually, pasting machines comprise several sections arranged one after the other which, in accordance with the invention, are respectively provided with several heating plates in transverse arrangement. In this connection, provision is made in one embodiment of the invention for the compressed air hoods respectively to cover one heating plate section and to be selected as to number and arrangement such that they extend over the line of separation between transversely adjacent heating plates. In this manner, the more or less sharp transition between transversely adjacent heating plates may be balanced in case of different temperatures.

In the following an example of embodiment of the invention will be explained in more detail by way of drawings.

Figure 1:
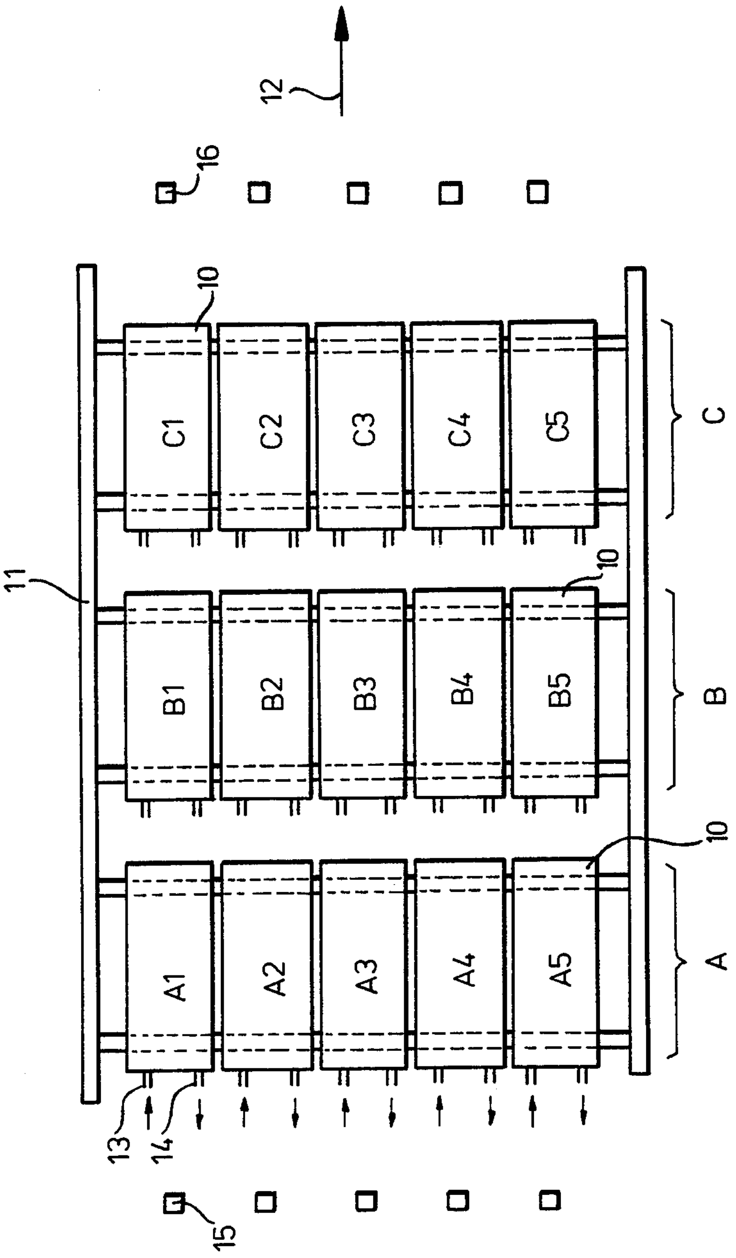
FIG. 1 shows a perspective top plan view on a pasting machine according to the invention.

The apparatus shown according to FIG. 1 is subdivided into three sections A, B, C. Each section comprises elongated rectangular heating plates 10, i.e. five plates 10 arranged side by side in parallel. They are disposed on a frame construction 11 not shown and described in any more detail. The number and dimensions of the heating plates 10 is such that the overall width of the entire heating surface formed by the individual heating plates 10 is broader than the maximum strip width. The feeding direction is indicated by the arrow 12. Each heating plate 10 is provided with two connections 13, 14 for the supply and discharge, respectively, of the heating medium such as vapour, for example. As will still be explained in more detail in the following, the supply of the heating medium to each individual heating plate 10 may also be controlled separately.

Each row of heating plates 10, for example, A1, B1 and C1, respectively has associated with it a moisture sensor 15. The moisture sensors are of a known design and may be contactless operating microwave sensors. The individual rows of the heating plates 10 may also have moisture sensor 16 associated therewith at the rear of the heating device.

Figure 2:
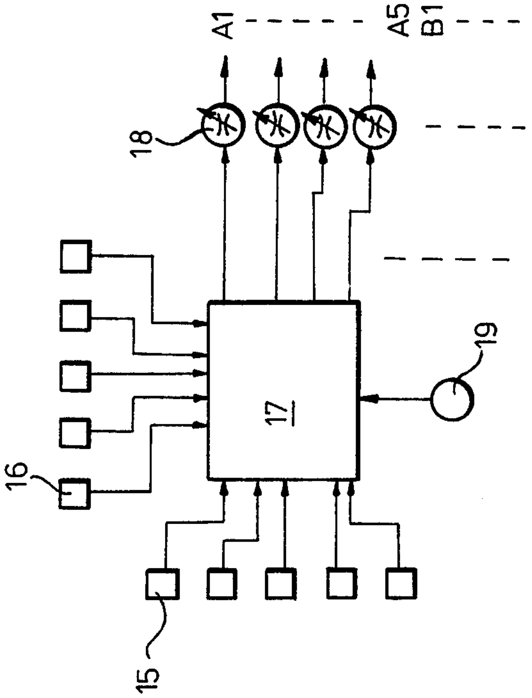
FIG. 2 shows diagrammatically a block type representation of the mode of operation of the device according to the invention.

In FIG. 2 a control device which may also comprise a regulator is designated with 17. Said control device provides corresponding commands of control and adjustment to regulating valves 18. Each heating plate 10 has a regulating valve 18 associated therewith. A speed sensor transmits a speed signal onto the control device 17.

If the moisture sensors 15 sense a higher degree of moisture in the marginal zones of the strip than in the center, a corresponding control of the heat supply is effected via the regulating valves 18. For istance, the marginal plates A1 and A5 may have a temperature of 180° C. at the heating surface, while the remaining ones A2 to A4 have a temperature of 100° C., for example. As most of the moisture is decomposed in the first section A, the following sections B and C are operated as usual with lower temperatures. With the aid of the moisture regulators 16 a regulation may also be effected in such a manner that the degree of moisture or degree of drying, respectively, is rendered adjustable.

The speed sensor 19 takes care of a heating of the heating plates 10 in dependence upon the speed.

Figure 3:
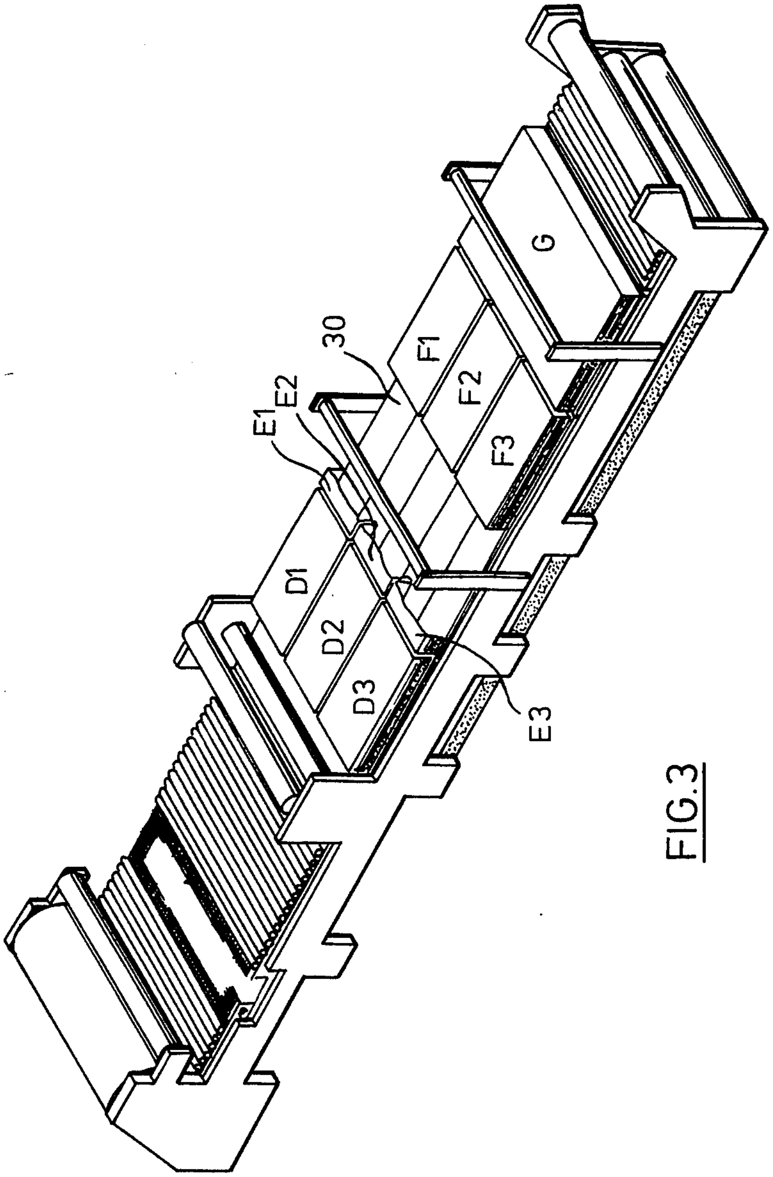
FIG. 3 shows a perspective diagrammatic view of a pasting machine according to the invention.

In FIG. 3 three sections of the pasting machine which is not explained in any more detail, are respectively provided with heating plates 30, similar to the heating plates A1 to A5, B1 to B5 and C1 to C5, respectively, according to FIG. 1. The individual sections have hoods D1 to D3, E1 to E3 as well as F1 to F3 associated therewith. The length thereof in this arrangement corresponds to the length of the heating plates 30. But they have a greater width. As the width of the pressure hoods exceeds that of the heating plates, the longitudinally extending lines of separation between the individual heating plates 30 are always covered by a pressure hood.

The pressure hoods D1 to D3, E1 to E3 and F1 to F3, respectively, are each supplied by a ventilator of its own or by a common source of compressed air, with the connection from the source of compressed air to the individual hoods, however, being controllable in such a manner that the pressure within the hoods is variable. As will be seen from FIG. 3, the last hood G in feeding direction extends over the entire width of the pasting machine.

The control of the compressed air bias within the hoods as described above may also be effected with the aid of the moisture sensors 15, 16 according to FIG. 2. Their signals, therefore, in addition to the regulating valves 18 for the steam supply, control further regulating valves for the supply of compressed air to the hoods and the ventilator drives, respectively, inside the hoods.

I claim:

1. A heating device for corrugated cardboard pasting machines comprising several heating plates spaced in the feeding direction and covering the maximum width of the corrugated cardboard strip, said heating plates being connectible to a source of heat via a control device with the corrugated cardboard being guided against the upward facing heating surface thereof under load by a loading belt and/or compressed air, characterized in that said several heating plates comprise at least one heating section said heating section comprising two or more separate heating plates arranged side by side transversely of the direction of movement of the corrugated cardboard and are adapted to be separately heated by means of the control device.

2. A device according to claim 1, characterized in that several heating sections are provided with two or more separate heating plates.

3. A device according to claim 1 characterized in that one heating plate in front of the heating device in the direction of movement respectively has associated therewith a moisture sensor.

4. A device according to claim 3, characterized in that the moisture sensors are coupled with the control device for the purpose of automatic control of the temperature of the individual heating plates.

5. A device according to claim 3, characterized in that further moisture sensors associated with the heating plates are arranged at the rear of the heating device in the direction of movement, which are connected to a regulator wherein the sensed moisture values are respectively compared with a preset value for the purpose of adjusting the heat supply to the heating plates by means of the control device.

6. A device according to claim 1, characterized in that a velocity sensor senses the velocity of the strip of corrugated cardboard and transmits a signal onto the control device for the purpose of controlling the heat supply to the heating plates in dependence upon the velocity of the strip.

7. A device according to claim 1, in which a hood-like weighting means is arranged above the corrugated cardboard strip effective to create an air pressure load on the corrugated cardboard strip from above, characterized in that two or more separate compressed air hoods are arranged in at least one section transversely of the feeding direction and are adapted to be controlled separately.

8. A device according to claim 7, characterized in that the compressed air hoods respectively cover one heating plate section and are selected as to number and arrangement such that they extend above the line of separation between transversely adjacent heating plates.

9. A device according to claim 2, characterized in that one heating plate in front of the heating device in the direction of movement respectively has associated therewith a moisture sensor.

10. A device according to claim 2, characterized in that a velocity sensor senses the velocity of the strip of corrugated cardboard and transmits a signal onto the control device for the purpose of controlling the heat supply to the heating plates in dependence upon the velocity of the strip.

11. A device according to claim 3, characterized in that a velocity sensor senses the velocity of the strip of corrugated cardboard and transmits a signal onto the control device for the purpose of controlling the heat supply to the heating plates in dependence upon the velocity of the strip.

12. A device according to claim 4, characterized in that a velocity sensor senses the velocity of the strip of corrugated cardboard and transmits a signal onto the control device for the purpose of controlling the heat supply to the heating plates in dependence upon the velocity of the strip.

13. A device according to claim 6, characterized in that a velocity sensor senses the velocity of the strip of corrugated cardboard and transmits a signal onto the control device for the purpose of controlling the heat supply to the heating plates in dependence upon the velocity of the strip.

14. A device according to claim 2 in which a hood-like weighting means is arranged above the corrugated cardboard strip effective to create an air pressure load on the corrugated cardboard strip from above, characterized in that two or more separate compressed air hoods are arranged in at least one section transversely of the feeding direction and are adapted to be controlled separately.

15. A device according to claim 3 in which a hood-like weighting means is arranged above the corrugated cardboard strip effective to create an air pressure load on the corrugated cardboard strip from above, characterized in that two or more separate compressed air hoods are arranged in at least one section transversely of the feeding direction and are adapted to be controlled separately.

16. A device according to claim 4 in which a hood-like weighting means is arranged above the corrugated cardboard strip effective to create an air pressure load on the corrugated cardboard strip from above, characterized in that two or more separate compressed air hoods are arranged in at least one section transversely of the feeding direction and are adapted to be controlled separately.

17. A device according to claim 5 in which a hood-like weighting means is arranged above the corrugated cardboard strip effective to create an air pressure load on the corrugated cardboard strip from above, characterized in that two or more separate compressed air hoods are arranged in at least one section transversely of the feeding direction and are adapted to be controlled separately.

* * * * *